United States Patent
Cluet Beltran et al.

(10) Patent No.: US 10,437,534 B2
(45) Date of Patent: Oct. 8, 2019

(54) DETERMINING A PAUSING POINT IN PRINTING

(71) Applicant: Hewlett-Packard Development Company, L.P., Houston, TX (US)

(72) Inventors: Jose Miquel Cluet Beltran, Barcelona (ES); Albert Crespi Serrano, Barcelona (ES); Oriol Borrell Avila, Sabadell (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/573,215

(22) PCT Filed: Jul. 24, 2015

(86) PCT No.: PCT/EP2015/067068
§ 371 (c)(1),
(2) Date: Nov. 10, 2017

(87) PCT Pub. No.: WO2017/016578
PCT Pub. Date: Feb. 2, 2017

(65) Prior Publication Data
US 2018/0095397 A1    Apr. 5, 2018

(51) Int. Cl.
*G03G 15/00* (2006.01)
*B41J 2/175* (2006.01)
(Continued)

(52) U.S. Cl.
CPC ........ *G06F 3/1235* (2013.01); *B41J 2/17566* (2013.01); *G03G 15/556* (2013.01);
(Continued)

(58) Field of Classification Search
CPC ................ G03G 15/556; B41J 2/17566; B41J 2002/17569; B41J 2002/17573;
(Continued)

(56) References Cited

U.S. PATENT DOCUMENTS 6,086,178 A * 7/2000 Kawashima ......... B41J 2/17566
347/23
6,106,108 A    8/2000 Cluet
(Continued)

FOREIGN PATENT DOCUMENTS

JP        04204468 A    7/1992
WO    WO-2007024422 A1    3/2007

OTHER PUBLICATIONS

Jon Lawrence, "FDM User Maintenance: Changing the Printer Cartridge During a Print Job", CAP University—The CAPINC Blog—SolidWorks & Stratasys Tutorials; Jul. 12, 2013, 2 pages.

*Primary Examiner* — Kristal Feggins
*Assistant Examiner* — Kendrick X Liu
(74) *Attorney, Agent, or Firm* — HP Inc. Patent Department

(57) ABSTRACT

In examples a printing system comprises a controller and a printing device. The controller is to divide a print job into a sequence of areas, wherein an image property varies between adjacent areas. The controller is to determine a pausing point to be within a runout area at which a remaining amount of a consumable will be at or below a predetermined first amount when executing the print job when the runout area fulfills a condition. The controller is to determine the pausing point to be within a preceding area that fulfills the condition when the runout area does not fulfill the condition. The controller is to control the printing device to pause printing of the print job at the pausing point.

13 Claims, 7 Drawing Sheets

(51) Int. Cl.
*G06F 3/12* (2006.01)
*G06K 15/00* (2006.01)

(52) U.S. Cl.
CPC ......... *G06F 3/121* (2013.01); *G06K 15/4075* (2013.01); *B41J 2002/17569* (2013.01); *B41J 2002/17573* (2013.01); *B41J 2002/17589* (2013.01)

(58) Field of Classification Search
CPC ............ B41J 2002/17589; G06F 3/121; G06F 3/1235; G06K 15/4075
See application file for complete search history.

(56) References Cited

U.S. PATENT DOCUMENTS

| | | |
|---|---|---|
| 6,293,657 B1 | 9/2001 | Garcia et al. |
| 6,498,202 B1 * | 12/2002 | Sun ........................ C09D 11/30 347/100 |
| 7,148,977 B2 | 12/2006 | Zerza et al. |
| 2005/0219602 A1 | 10/2005 | Mikami |
| 2008/0124097 A1 | 5/2008 | Kong et al. |
| 2008/0181628 A1 | 7/2008 | Ahn |
| 2011/0057971 A1 | 3/2011 | Yokoyama et al. |
| 2012/0105530 A1 * | 5/2012 | Munakata ............ B41J 2/17566 347/14 |

* cited by examiner

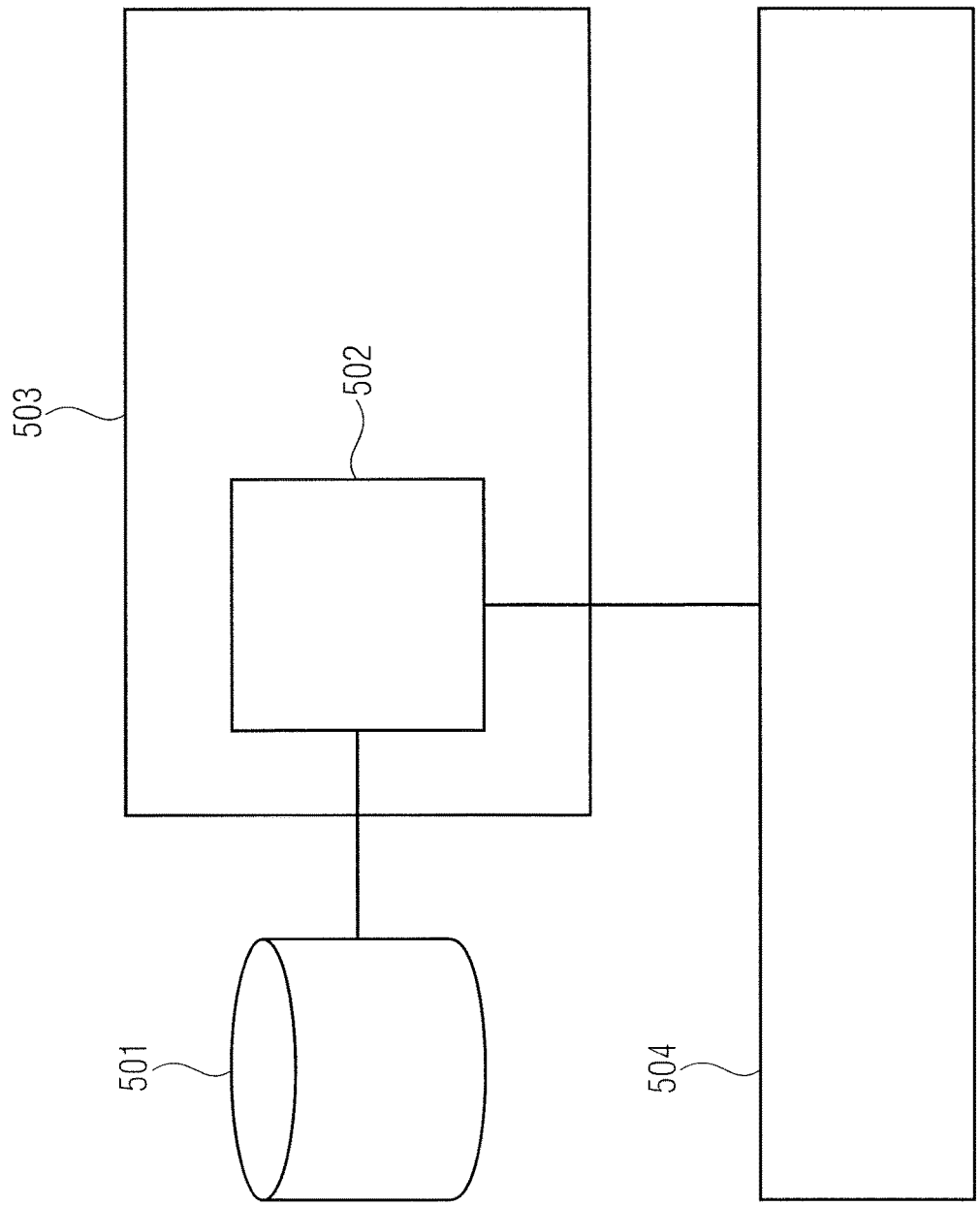

DETERMINING A PAUSING POINT IN PRINTING

BACKGROUND

Printing systems comprise consumables that may have to be replaced. Example consumables of printing systems may include, for instance, supplies, maintenance cartridges and ink cartridges, print media such as paper or foil, and printheads.

These consumables may be changed during the printing of a plot, i.e., during execution of a print job. During the change, the print job is paused and once the consumable is replaced, the printing system continues printing from where it is stopped.

BRIEF DESCRIPTION OF THE DRAWINGS

Examples will now be described by way of non-limiting example only with reference to the accompanying drawings, in which:

FIG. 5 shows a block diagram of a non-transitory machine-readable storage medium, a processing resource, a computing device and a printing system according to an example.

DETAILED DESCRIPTION

Figure 1A:
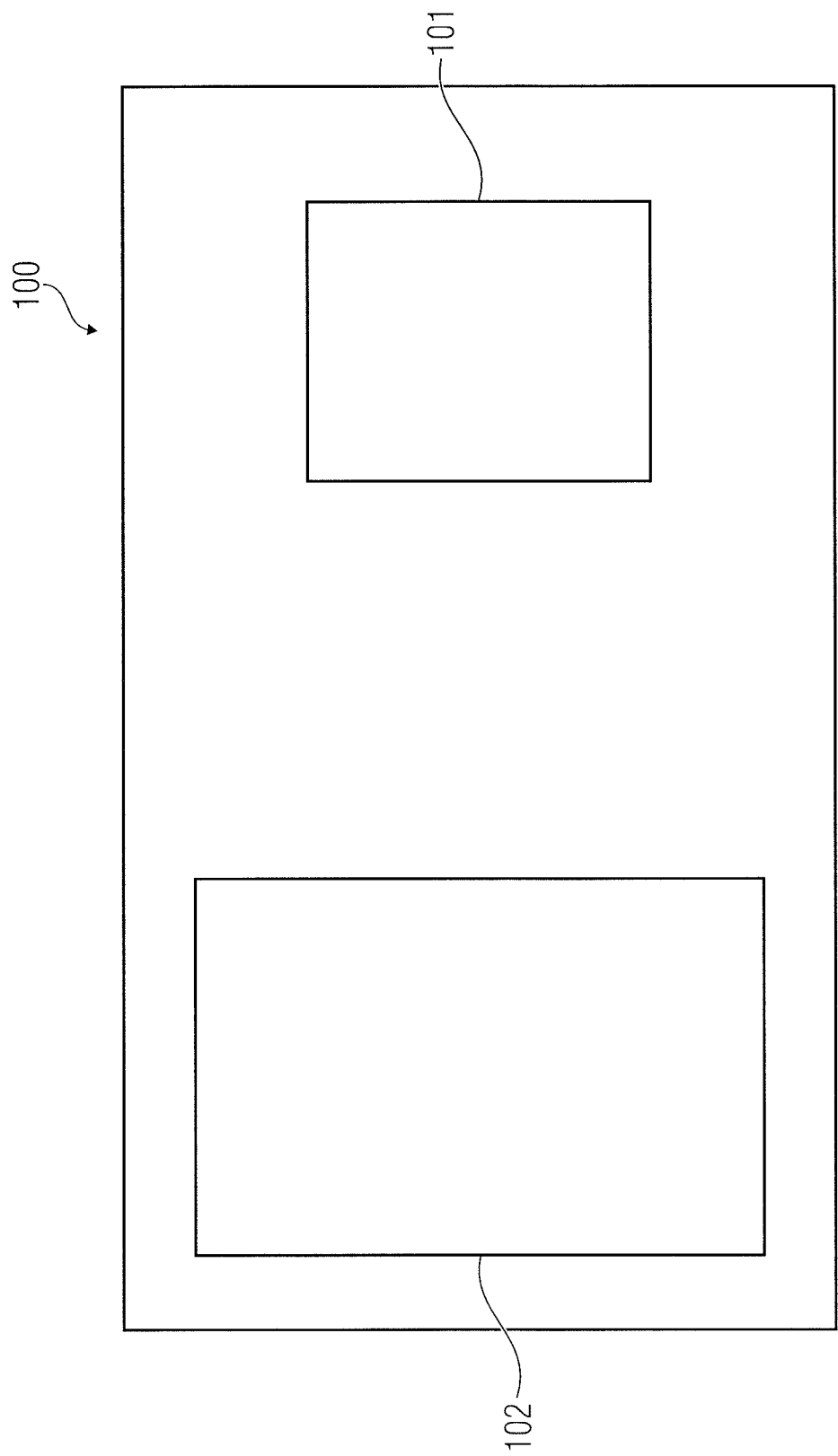
FIG. 1A shows a printing system according to an example.

Some of the examples that will be described in the following refer to printing systems comprising a controller and a printing device. The controller is to divide a print job into a sequence of areas, wherein an image property varies between adjacent areas. The controller is further to determine a pausing point to be within a runout area at which a remaining amount of a consumable is at or below a predetermined first amount when executing the print job when the runout area fulfills a condition and to determine the pausing point to be within a preceding area that fulfills the condition when the runout area does not fulfill the condition. The controller is further to control the printing device to pause printing at the pausing point. With these printing systems, it is possible to pause printing of a print job in order to change, replace or refill consumables during the execution of the print job. The printing systems interrupt the printing process at a previously determined pausing point. The pausing point may be selected such that impact on image quality of the print job is low, and, at the same time, the consumption of the consumable is effective.

The image property may be any property of interest. According to an example, the image property is a print density of an image. A print density may be the total amount of an applied printing consumable in a considered region of an image. For example, the printing consumable may be a toner of any color. Accordingly, the print density may be the total amount of the applied toner of the respective color in a considered region of the image. The print density may, for example for ink-jet printers, be an ink density. An ink density may, for instance, be the total amount of applied ink of a certain color in a considered region of an image. For example, the higher the ink density in a certain image region, the higher is the amount of the applied ink in this region. An image area may comprise several image regions. A sequence of areas may comprise two or more areas wherein the print density, e.g., ink density, of adjacent areas varies.

According to an example, the condition is fulfilled when the print density is at or below a threshold. The threshold may indicate the borderline between varying print densities. For example, the threshold may indicate the borderline between areas of low print density and areas of high print density. Accordingly, each of the areas of the sequence of areas may, for instance, be divided into one of two separate areas, namely into either an area of high print density or into an area of low print density. The threshold may be variable and may be set by a user or by the printing system.

According to an example, the controller is to compare the remaining amount of a consumable at an area that fulfills the condition with the remaining amount of a consumable at a subsequent area that fulfills the condition, and to select the subsequent area as the runout area when the remaining amount of a consumable at the subsequent area is smaller than the remaining amount of a consumable at the preceding area that fulfills the condition. The controller may have information about the current and/or remaining amount of the consumable, for example, information about a current and/or remaining fill level of an ink cartridge. The controller may further have information about the remaining amount of the consumable at the areas that fulfill the condition. For example, a consumable may comprise a certain remaining amount at an area that fulfills the condition. When the remaining amount is at or below the predetermined first amount, then this area may be marked as the runout area. If, at a subsequent area that also fulfills the condition, the consumable may still comprise a certain remaining amount at this subsequent area, i.e., when the consumable is not yet empty, then the controller is to select this subsequent area as the runout area.

According to an example, the controller is to check whether the remaining amount of the consumable is at or below a predetermined second amount at the pausing point; and, when yes, to control the printing device to pause printing of the print job at the pausing point; and, when not, to control the printing device to pause printing of the print job at a point where the amount of consumable runs out. The predetermined second amount may be variable and may be set by the printing system or by a user. For example, the predetermined second amount may be a maximum level to be maintained in the consumable at the pausing point. For example in an ink cartridge, the predetermined second amount may be a maximum fill level, i.e., a maximum amount of ink, to be contained in the cartridge at the pausing point. In other words, the predetermined second amount determines the maximum amount to waste when the consumable is to be replaced. The predetermined second amount may be lower than the predetermined first amount.

According to an example, the controller is to divide the print job into a sequence of areas based on preview image data. The preview image data may be provided to the printing system by the printer driver or by a raster image processor. The preview image data may represent a preview image of the print job. The preview image may have, for instance, a size of 1.200×1.800 pixels. The size may, however, also be lower or higher. Accordingly, the print job is analyzed and divided into a sequence of areas based on the preview image data, i.e., prior to the beginning of the physical printing process.

In an example, the sequence of areas is a sequence of horizontal areas that are perpendicular to a print medium feed direction. The print medium feed direction is the direction of the print medium in which it is fed through the printing system, for example in the direction in which it is fed through the print head device. The sequence of horizontal areas is a sequence of at least two areas that are adjacent to each other. These areas are horizontal, i.e., adjacent areas are horizontally separated from each other and thus form horizontal areas. These horizontal areas are perpendicular to the print medium feed direction. In other words, the print job that is to be printed on the print medium is divided into horizontal areas which may be similar to horizontal lines or bars.

In an example, the controller is to determine a remaining amount of a consumable associated with each area based on an expected consumable consumption in each area for at least one color. Thus, the controller may, prior to executing the physical printing process, calculate an expected fill level of the consumable at each area. In other words, the controller is to check at each area how much remaining amount is to be expected to be contained at the respective area. This calculation is based on an expected consumable consumption. For example, the controller may determine that the consumable may have a remaining amount of 5% at a first area. The controller may calculate an expected consumable consumption for a subsequent second area. In this example, the result of the difference between these two values, i.e., between the remaining amount of the first area and the expected consumable consumption in the second area, is the expected remaining amount of the consumable in the second area. The controller is to determine the remaining amounts in each area and for at least one color that is used in the printing system.

In an example, the controller is to determine the image property of the areas and to differently weigh different colors when determining the image property. The image property may vary depending on the used color. For example, black is better visible for the human eye than yellow. Thus, an image area filled with a certain amount of black color may appear to have a higher print density than an image area filled with the same amount of yellow color. Thus, while the amount of both colors may be the same, the perceived print density may vary. Accordingly, the controller may calculate a print density of each area by differently weighing black and yellow color, such that the black area may be categorized as a high print density area while the yellow area may be categorized as a low print density area, even though the amounts of applied black and yellow color may be the same.

According to an example, the controller is to assign highest weights to black and magenta when determining the image property. Thus, when determining an image property of an area, those areas that comprise regions filled with a certain amount of black or magenta may be categorized as having a different image property than areas that comprise regions filled with the same amount of other colors.

According to an example, the controller is to control the printing device to pause printing of the print job at the pausing point when a print medium is of a first media type and to control the printing device to pause printing of the print job at a point where the amount of consumable runs out when the print medium is of a second media type. In other words, the pausing point may be determined based on the used media type. For example, a pausing point as described above may be determined when using a high quality paper for performing a print job. However, when a low quality paper is used for the same print job instead, the printing device may print as long as the amount of a consumable runs out, e.g., as long as a cartridge runs out of ink. In this example, the print job may be paused at the point where the cartridge is empty, independent from any determination whether the pausing point is within an area that fulfills the condition or not. For example, the print job may be paused within a high ink density area. Alternatively, the print job is finished while the empty color is not used for the rest of the print. This may, however, lead to an incomplete result. Thus, the entire print job may be repeated after the empty cartridge is replaced.

According to an example, the controller is to control the printing device to pause printing of the print job at the pausing point when the medium comprises a first width and to control the printing device to pause printing of the print job at a point where the amount of consumable runs out when the print medium comprises a second width. In other words, the pausing point may be determined based on the width of the used print medium. For example, when a print roll may exceed a certain roll width, the printing device may print as long as the amount of a consumable runs out, e.g., as long as a cartridge runs out of ink. In this example, the print job may be paused at the point where the cartridge is empty, independent from any determination whether the pausing point is within an area that fulfills the condition or not. For example, the print job may be paused within a high ink density area. Alternatively, the print job is finished while the empty color is not used for the rest of the print. This may, however, lead to an incomplete result. Thus, the entire print job may be repeated after the empty cartridge is replaced.

Referring now to the Figures, FIG. 1A shows a printing system 100 comprising a controller 101 and a printing device 102. The controller 101 is to divide a print job into a sequence of areas.

Figure 1B:
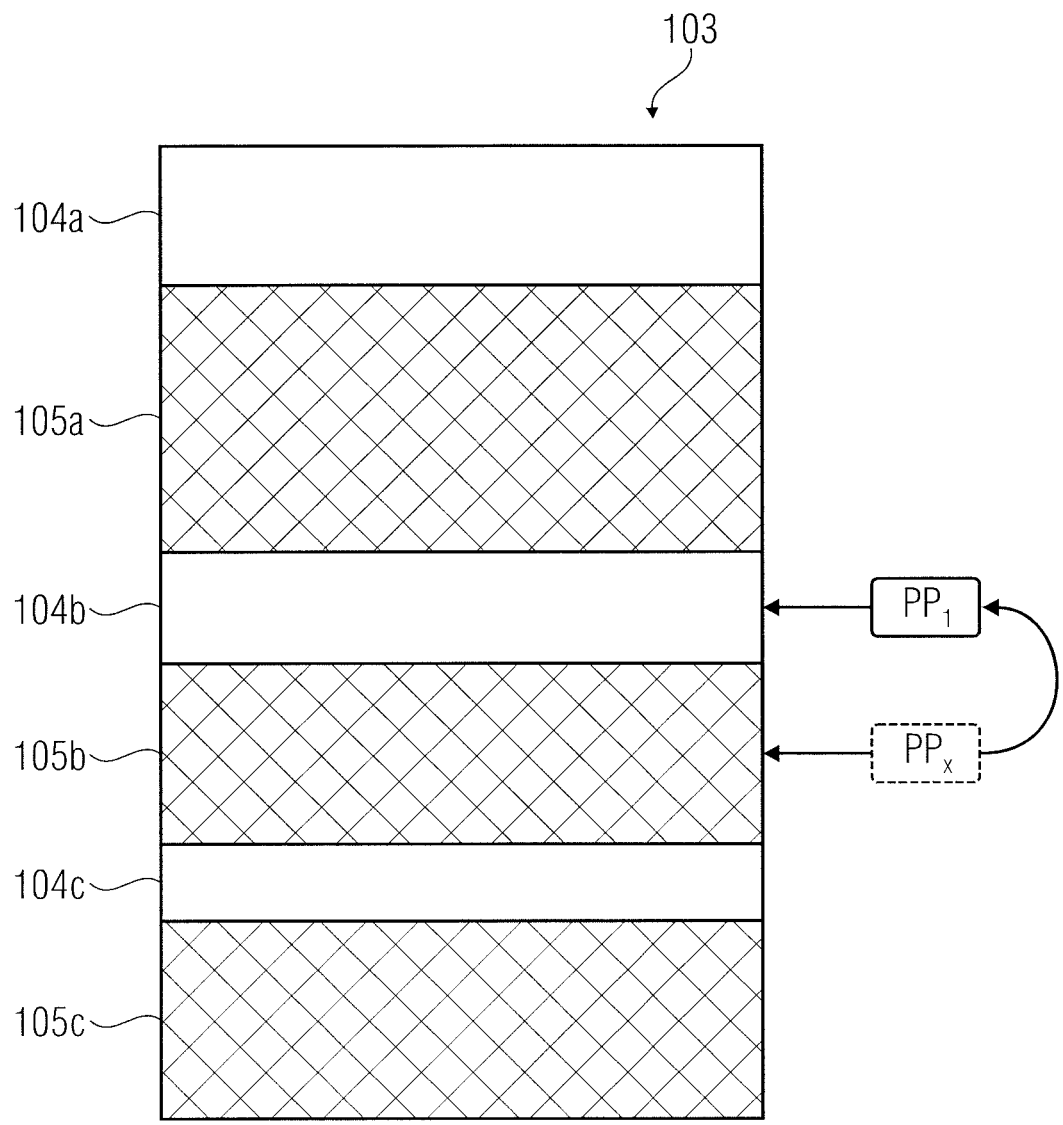
FIG. 1B shows a schematic print job divided into a sequence of areas according to an example.
Figure 1C:
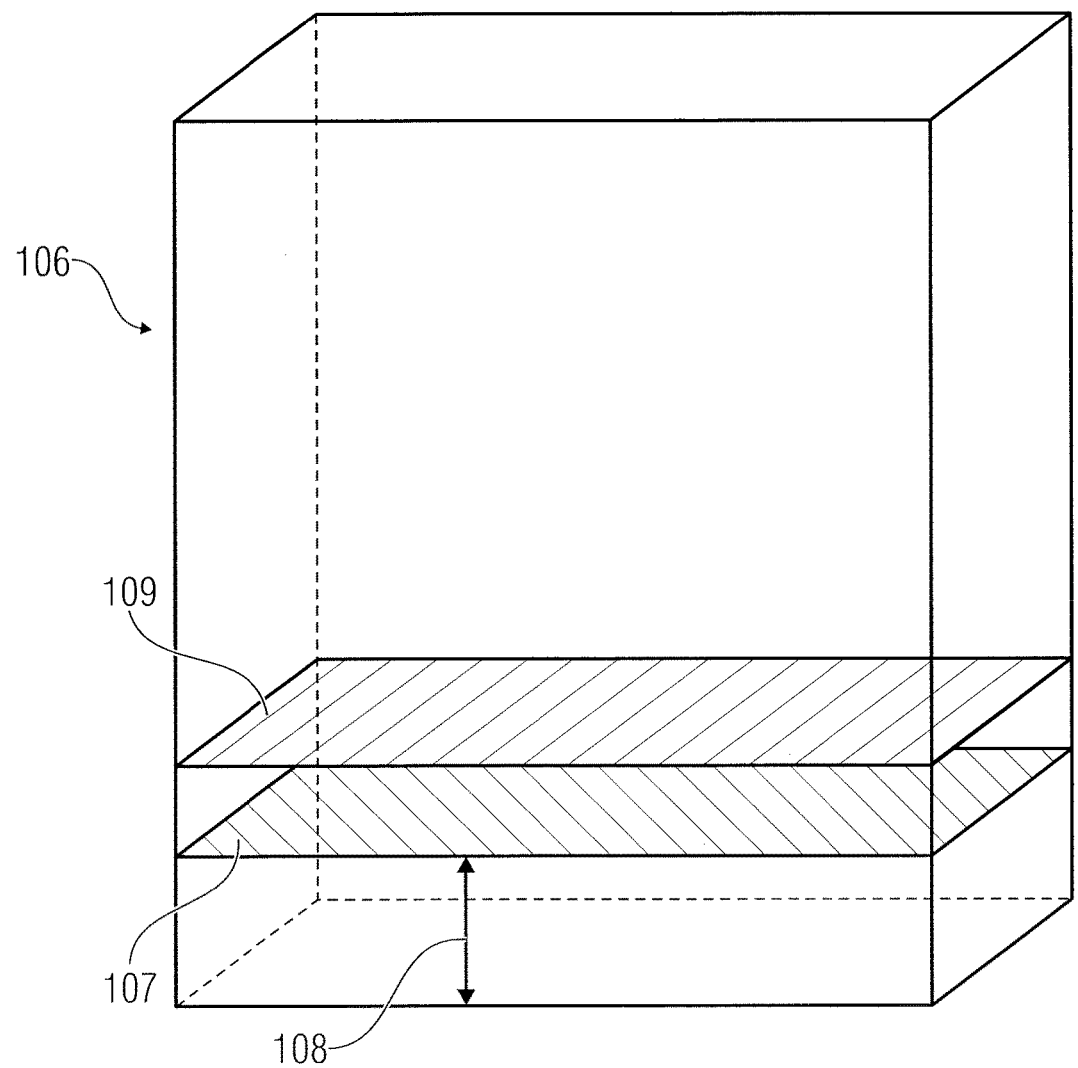
FIG. 1C shows a remaining amount of a consumable according to an example.

FIG. 1B shows, by way of example, a print job 103 that has been divided into a sequence of areas 104a to 104c and 105a to 105c. Each area comprises an image property. In the example of FIG. 1B, the sequence of areas is divided into areas of two different image properties. The sequence of areas comprises areas 104a to 104c having a first image property, as indicated by blank spaces, and areas 105a to 105c having a second image property, as indicated by cross-hatched lines. As can be seen, areas 104a to 104c comprising a first image property alternate with areas 105a to 105c comprising a second image property. Accordingly, the image property varies between adjacent areas.

Printing systems may further comprise at least one consumable that may be replaceable. FIG. 10 shows, by way of example, a toner cartridge as a non-limiting example for a consumable 106. However, other consumables may include printheads, maintenance cartridges, supplies or the like.

The cartridge 106 of FIG. 10 may be at least partially filled with ink, depending on the cartridges previous consumption. Accordingly, the cartridge 106 may comprise a current fill level which indicates the remaining amount of ink contained therein. The controller 101 has information about the current fill level, which information may be provided to the controller 101 by a fill-level calculation unit or the like. Thus, the controller 101 has information about a remaining amount of ink contained within the cartridge 106, i.e., about the remaining amount of the consumable 106.

A current fill level is indicated by the surface 107 which surface 107 may represent an upper surface of the ink contained within the cartridge 106. Thus, a remaining amount 107 of ink is contained within the cartridge 106. A height of the remaining amount 107 is indicated by the arrow 108.

The controller 101 may have information about a predetermined first amount within the cartridge 106. The predetermined first amount may be a reference value, e.g., a fill-level value, representing a certain reference amount of remaining ink. This predetermined first amount is indicated in FIG. 10 by the surface 109. The controller 101 is to determine whether the remaining amount 107 of ink in the cartridge 106 is at the predetermined first amount 109, above the predetermined first amount 109 or below the predetermined first amount 109, i.e., at, above or below the reference amount 109.

In an example, the predetermined first amount 109 may be a low-level reference value. In other words, when a current ink level 107 arrives at the reference amount 109 or drops below the reference amount 109, this might be an indication that the cartridge 106 runs out of ink and will soon be empty.

The controller 101 is to determine, within the sequence of areas, the one area in which the cartridge 106 will presumably run out of ink. This particular area is therefore called a runout area.

Accordingly, depending on the current ink level 107 and the pending print job, the cartridge 106 may run out of ink at one of areas 104a to 104c or at one of areas 105a to 105c. Referring to FIG. 1B again, it can be seen that a runout area may be one of areas 104a to 104c as well as one of areas 105a to 105c. In either case, the controller 101 is to determine whether the expected runout area fulfills a certain condition. A condition may be a certain image property criteria. The controller 101 may check, for instance, whether the expected runout area may fulfill a certain image property criteria.

Still with reference to FIG. 1B, the controller 101 is further to determine a pausing point $PP_1$, $PP_x$. A pausing point is a point at which the printing process of the print job pauses.

Before starting the physical print process of a pending print job, the controller determines an expected runout area. For example, with reference to FIG. 1B, the expected runout area may be the area 104b. The controller 101 checks whether the area 104b fulfills a certain condition, e.g., whether the area 104b fulfills a certain image property criteria. When the area 104b, which has been selected as the expected runout area, fulfills this image property condition, the controller 101 may set a pausing point $PP_1$ in this area 104b.

However, it may be possible that a selected runout area does not fulfill the condition. This shall be described, by way of example, with reference to area 105b. For example, the controller 101 may determine that the cartridge 106 will presumably run out of ink within the area 105b. Accordingly, the controller 101 may select the area 105b as a potential runout area. A hypothetical pausing point $PP_x$ may therefore be set within the runout area. However, before actually setting a pausing point, the controller 101 checks whether the selected runout area 105b indeed fulfills the desired condition. When the controller 101 now determines that the selected runout area 105b does not fulfill the condition, the pausing point will not be set within this selected runout area 105b. Instead, the controller 101 sets the pausing point within a preceding area 104b which fulfills the condition. In other words, the controller jumps back to a preceding area 104b and checks whether this preceding area 104b fulfills the desired condition. When this preceding area 104b fulfills the condition, then the pausing point $PP_1$ is set within this preceding area 104b. A pausing point $PP_1$ may be set at any point or region within a selected area.

After having determined a pausing point, the controller 101 may control the printing device 102 to pause printing of the print job at the selected pausing point.

Figure 2:
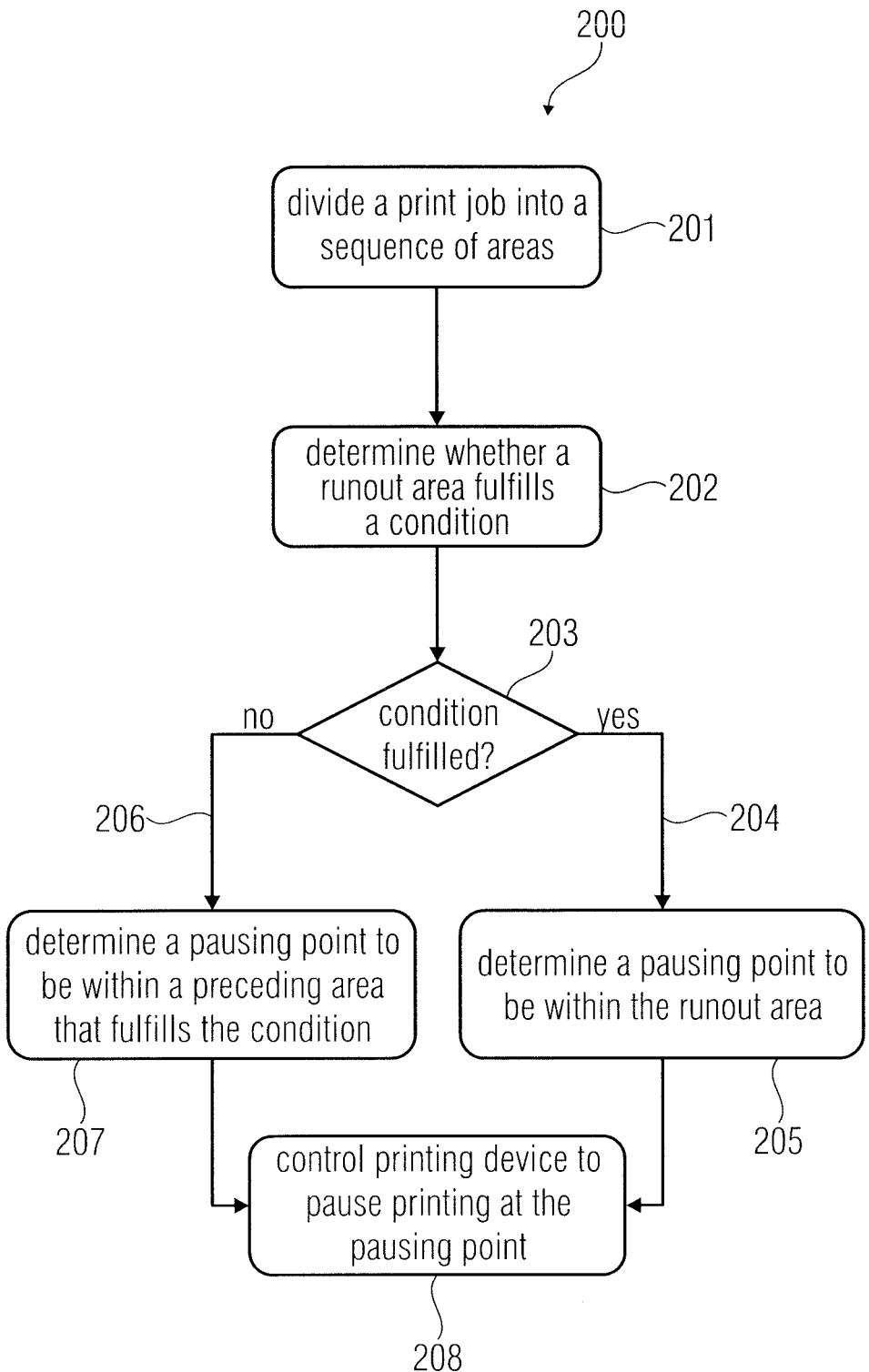
FIG. 2 shows a flow chart of a method according to an example.

FIG. 2 shows an example of a flow chart in which a method 200 according to an example is depicted.

At 201 a print job is divided into a sequence of areas, wherein an image property varies between adjacent areas.

At 202 it is determined whether a runout area at which a remaining amount of a consumable is at or below a predetermined first amount when executing the print job fulfills a condition.

At 203 it is determined whether the runout area fulfills the condition. When the condition is fulfilled, as indicated by branch 204, a pausing point is determined at 205 which pausing point is within the runout area. When the condition is not fulfilled, as indicated by branch 206, a pausing point is determined at 207 which pausing point is within a preceding area that fulfills the condition.

In either case, the printing device is controlled at 208 to pause printing of the print job at the pausing point.

In an example, the image property is a print density of an image. A print density may, for instance, be an ink density. A print job, and a corresponding preview image, may comprise areas of different ink density.

Figure 3:
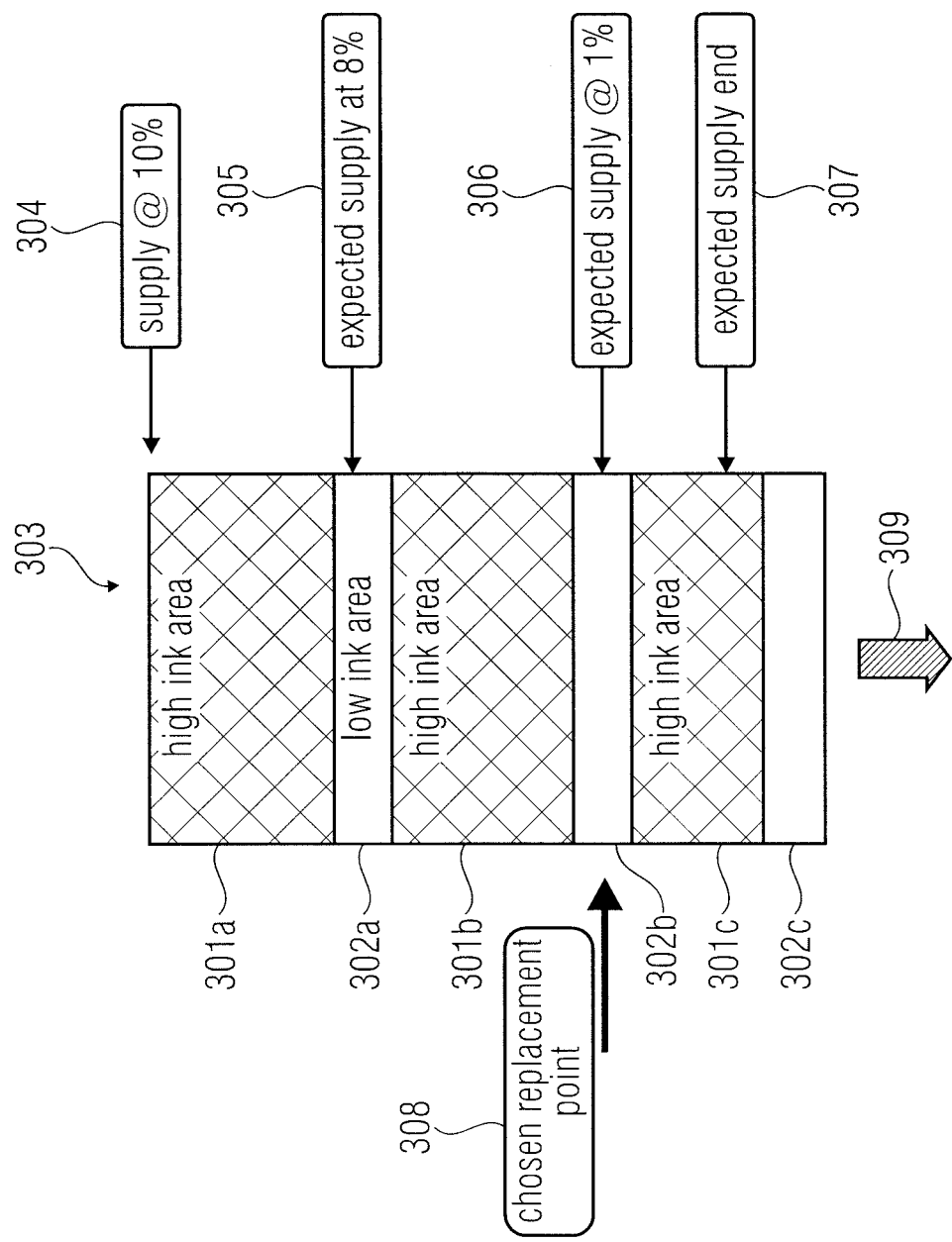
FIG. 3 shows a schematic print job divided into a sequence of areas according to an example.

FIG. 3 shows a print job 303 that is divided into a sequence of areas of different ink density. In particular, the print job 303 comprises areas of high ink density 301a to 301c and areas of low ink density 302a to 302c.

The controller 101 is to determine the image property, i.e., the ink density, of the areas and to differently weigh different colors when determining the image property, i.e., the ink density. The controller 101 may assign a highest weight to black and/or magenta.

For example, the print job 303 may be a plot comprising different colors. It may be possible that the first high ink area 301a contains a high amount of black and/or magenta. The subsequent area, i.e., the first low ink area 302a may contain the same amount of a color, but the color itself may be different from black and magenta. The first low ink area 302a may, for instance, comprise a certain amount of yellow, cyan, light cyan, light magenta or an optimizer ink.

Since the controller 101 is to assign different weights to different colors, the ink density of the first high ink area 301a may be weighted higher than the ink density of the first low ink area 302a, because the first high ink area 301a may contain a higher amount of high-weighted colors, such as black and magenta, than the first low ink area 302a. Thus, the controller 101 determines the image properties of the print job 303 and divides the print job 303 into a sequence of corresponding areas, i.e., into a sequence of high ink areas 301a to 301c and low ink areas 302a to 302c.

The partition of a print job into a sequence of areas is preferably made at a preview image of the actual print job. The printer driver or a raster image processor may provide a preview image data to the controller 101. Preview image data may represent a preview image of the actual print job. The preview image may be a jpg, bmp, tiff or the like and may have a resolution of 1.200×1.800 pixels or higher.

The controller 101 may analyze the preview image as described above. The controller may divide the preview image into a sequence of areas. As shown in FIG. 3, the depicted print job 303 may be a preview image of the actual print job. As mentioned above, the controller 101 knows the remaining amount, e.g., a current fill level, of the supply at the beginning of the print job. This remaining amount is indicated by reference numeral 304. At the beginning of the print job, the consumable has a remaining amount of about 10%.

The preview image 303 of the print job is divided into a sequence of high ink areas 301a to 301c and low ink areas 302a to 302c. According to an example, the controller 101 is to determine a remaining amount of the consumable associated with each area 301a to 301c and 302a to 302c based on an expected consumable consumption in each area for at least one color.

In other words, the controller 101 may determine the amount of ink consumption in the first high ink area 301a. The controller 101 may, for instance, calculate that printing the first high ink area 301a would lead to an ink consumption of about 2%. The calculated and thus expected remaining amount of the supply at the subsequent first low ink area 302a after having printed the first high ink area 301a would be about 8%, as indicated by reference numeral 305. Generally, a supply consumption in the low ink density areas 302a to 302c may be lower than in the high ink density areas 301a to 301c.

The controller 101 may continue this calculation within the subsequent areas 302a to 302c and 301b to 301c. The controller 101 may continue this calculation in each area. Furthermore, the controller 101 may continue this calculation for one or more colors.

The controller 101 may continue this calculation until a point where the supply presumably runs out, as indicated by reference numeral 307. This expected supply end 307 lies within the third high ink area 301c. Thus, the third high ink area 301c is selected as a potential runout area. However, before the third high ink area 301c is finally selected as the actual runout area, the controller determines whether the third high ink area 301c fulfills the condition.

According to an example, the condition is an ink density and the condition is fulfilled when the ink density is at or below a threshold. The threshold may be a certain value of ink density which defines the border between high ink density areas 301a to 301c and low ink density areas 302a to 302c. Accordingly, in the example of FIG. 3, the condition may be fulfilled when the possible runout area is an area of low ink density. However, the expected supply end 307 lies above the threshold, i.e., the expected supply end 307 lies within a high ink density area, namely in the third high ink area 301c. Thus, the controller 101 may select a preceding low ink area, as low ink areas lie at or below the threshold and therefore fulfill the condition.

For example, the controller 101 may determine that the expected remaining amount of the supply at the second low ink area 302b may be at about 1%, as indicated by reference numeral 306. Accordingly, the controller 101 selects the preceding low ink area, namely the second low ink area 302b, as the actual runout area. The controller 101 sets a pausing point, also referred to as a chosen replacement point 308, in the runout area 302b.

In the example described with reference to FIG. 3, the second low ink area 302b was selected as the actual runout area. However, the preceding first low ink area 302a also fulfills the condition and could therefore also be selected as the actual runout area. Thus, the controller 101 is to select the one low ink area at which a remaining amount of the supply is closer to zero. In other words, the controller checks at which low ink area 302a to 302c the remaining amount of the supply is at a minimum. The remaining amount of the supply at the first low ink area 302a is at about 8%, while the remaining amount of the supply at the second low ink area 302b is at about 1%. Thus, the controller 101 selects the second low ink area 302b as the actual runout area.

Accordingly, the controller 101 is to compare the remaining amount 305 of a consumable at an area 302a that fulfills the condition with the remaining amount 306 of a consumable at a subsequent area 302b that fulfills the condition, and to select the subsequent area 302b as the runout area when the remaining amount 306 of a consumable at the subsequent area 302b is smaller than the remaining amount 305 of a consumable at the preceding area 302a that fulfills the condition.

According to the examples in the present disclosure, a runout area is an area at which a remaining amount of a consumable is at or below a predetermined first amount. As mentioned above, this predetermined first amount may indicate a low or a minimum fill level of the consumable and may indicate to a user that the respective consumable is running out in the near future. The predetermined first amount also indicates to the controller 101 that one of several areas at which the consumable may have a remaining amount at or below the predetermined first amount can potentially be selected as a potential runout area.

By way of a non-limiting example, a predetermined first amount may be a remaining amount of about 10%. As shown in FIG. 3, the first low ink area 302a at which the consumable may have a remaining amount of about 8% as well as the second low ink area 302b at which the consumable may have a remaining amount of about 1% can potentially be selected as a potential runout area since the remaining amount of the consumable is at both low ink areas 302a, 302b below the predetermined first amount of, for instance, 10%.

According to a further example, the controller 101 is to check whether the remaining amount of the consumable 106 is at or below a predetermined second amount at the pausing point; and, when yes, to control the printing device 102 to pause printing of the print job at the pausing point; and, when not, to control the printing device 102 to pause printing of the print job at a point where the amount of consumable runs out.

This predetermined second amount may, for instance, indicate a maximum amount of ink per supply to be wasted at the pausing point. In other words, the predetermined second amount may indicate a maximum fill level that is allowed to remain in the supply at the pausing point.

A predetermined second amount of the supply may, for instance, be 5%. That is, a maximum of 5% is allowed to be wasted at the pausing point. In other words, when the supply comprises, at a potential runout area, a remaining amount of more than 5%, than this potential runout area is not selected as the actual runout area. When the supply comprises, at a potential runout area, a remaining amount of 5% or less than 5%, than this potential runout area may be selected as the actual runout area.

Again with reference to FIG. 3, the first low ink area 302a may be a potential runout area, because the remaining amount of 8% is below the predetermined first amount of, for instance, 10%, as described in more detail above. However, the remaining amount of 8% of the first low ink area 302a is above the predetermined second amount of 5%. Accordingly, when the first low ink area 302a was selected as the actual runout area, more than 5%, in one example the remaining 8%, would be wasted. Thus, the first low ink area 302a is not selected as the actual runout area.

The remaining amount of the supply at the second low ink area 302b is, however, below the predetermined second amount, i.e., below 5% in this example. Thus, the second low ink area 302b will be selected as the actual runout area. Accordingly, the pausing point would be set within the second low ink area 302b.

In the hypothetical case that an expected supply end would lie within the second high ink area 301b, the preceding first low ink area 302a may be determined as a potential runout area. However, as the remaining amount at the first low ink area 302a is at 8%, this remaining amount is not below the predetermined second amount of, for instance, 5%. Thus, the controller does not select the first low ink area 302a as the actual runout area, because otherwise, more ink as desired, i.e., more than 5%, would be wasted. In this case, the controller 101 controls the printing device 102 to pause printing at a point where the amount of consumable runs out. In other words, the printing device 102 may print, within the second high ink area 301b, as long as the supply runs out of ink.

As can also be seen in FIG. 3, the sequence of areas is a sequence of horizontal areas. When the print job is sent to the printing device 102 and the printing device 102 executes the physical printing process, the print medium is fed through the printing device 102 in a print medium feed direction 309. The print medium feed direction 309 may be at least substantially perpendicular, such as completely perpendicular, to the movement of the print heads. The sequence of areas may also be a sequence of horizontal areas that are perpendicular to the print medium feed direction 309. Generally, the areas may be perpendicularly aligned with the moving direction of the print heads.

Figure 4:
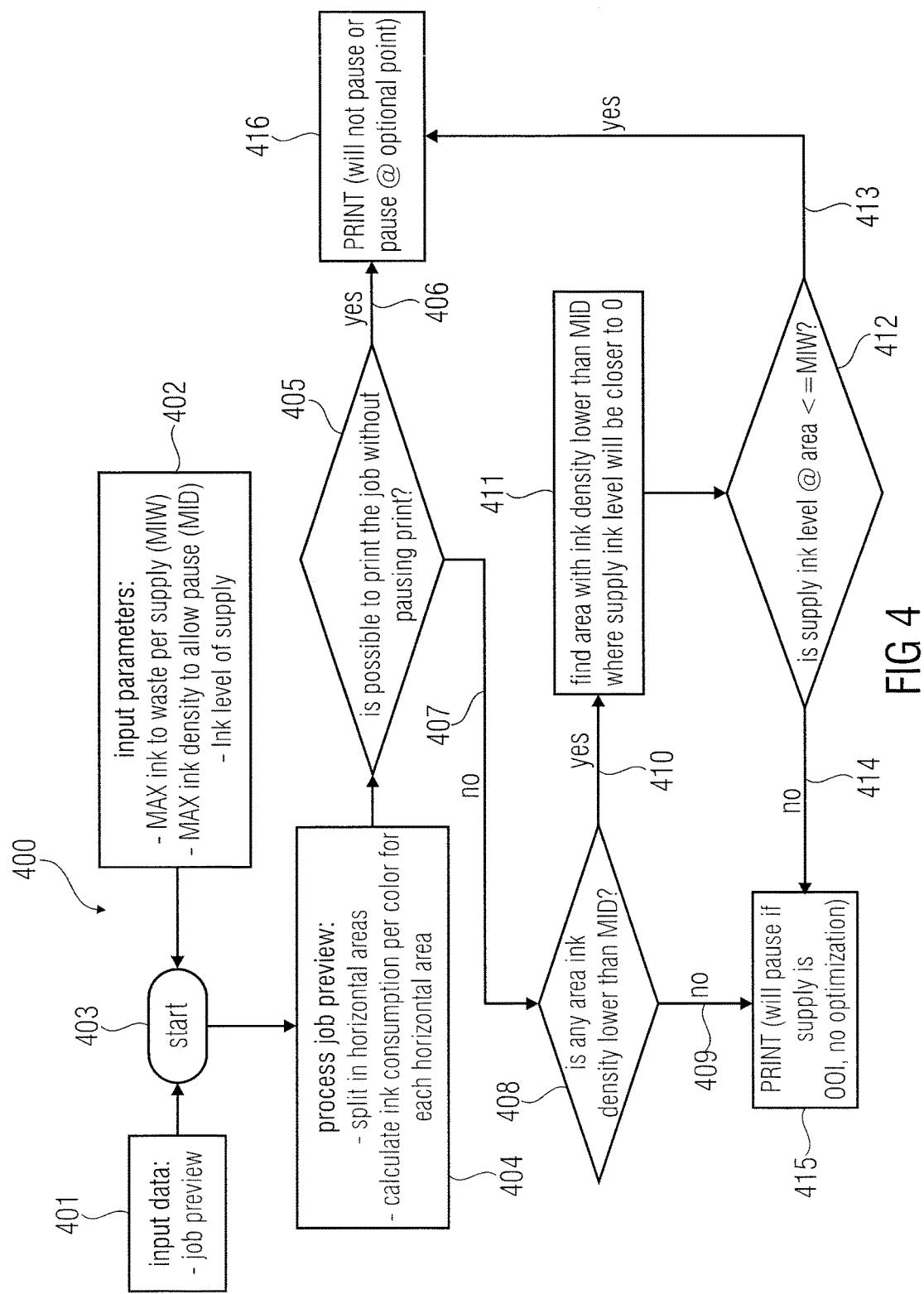
FIG. 4 shows a flow chart of a method according to an example.

FIG. 4 shows a flow chart of a method 400 according to an example.

At 401 input data are provided. Input data may be preview image data which may represent a preview image of the pending print job.

At 402 the controller receives input parameters. A first input parameter may be the current fill level of the supply. A second input parameter may be a maximum ink density of the print job in which a pause is allowed (MID). A third parameter may be a second predetermined amount, namely the maximum amount of ink to waste per supply (MIW).

Block 403 is a starting point of a process for processing at least one of the input data and/or the input parameters. At 404 the print job is divided into a sequence of areas. In particular, the print job preview is split into horizontal areas. Furthermore, an ink consumption per color is calculated for each horizontal area.

At 405 it is checked by the controller whether it is possible with the remaining amount of ink to print the print job without pausing the print. Therefore, the controller may calculate an expected ink consumption for the pending print job. The controller may have information about the current fill level of the ink cartridges. The controller may subtract the expected ink consumption from the current fill level. Thus, the controller may determine whether the remaining amount of ink is sufficient for printing the entire print job. When this is possible, then the physical printing process will be executed, as indicated by branch 406. The print job will not be paused. When it is not possible, as indicated by branch 407, then the method goes on at 408.

At 408 it is determined whether a potential runout area fulfills a condition, namely whether a potential runout area comprises an ink density that is lower than the previously set MAX ink density (MID).

If no such area can be found, as indicated by branch 409, then the print job is printed without the determination of a pausing point. Accordingly, the printing device 102 prints at 415 as long as a supply runs out of ink. In other words, the print job may be paused at the point where the cartridge is empty, independent from any determination whether the pausing point is within an area that fulfills the condition or not. For example, the print job may be paused within a high ink density area. Alternatively, the print job is finished while the empty color is not used for the rest of the print. This may, however, lead to an incomplete result. Thus, the entire print job may be repeated after the empty cartridge is replaced.

On the other hand, when a low density area can be identified, as indicated by branch 410, the controller may check at 411 whether there is a low ink density area at which the remaining amount of the supply is closer to a value of zero. For example a remaining amount at the second low ink area 302b in FIG. 3 may have a value closer to zero compared to the remaining amount at the first low ink area 302a.

At 412 it is checked whether the remaining amount is at or below a predetermined second amount. In particular, it is checked whether the remaining amount at the selected runout area is at or below the value MAX ink to waste (MIW). When the answer is yes, as indicated by branch 413, then a pausing point according to the described examples will be determined and the physical print job pauses at 416 at this pausing point. When the answer is no, as indicated by branch 414, then the printing device 102 prints at 415 as long as a supply runs out of ink.

FIG. 5 shows a block diagram of a non-transitory machine-readable storage medium 501 encoded with instructions executable by a processing resource 502 of a computing device 503 to operate a printing system 504 to perform a method. The method comprises dividing a print job into a sequence of areas, wherein an image property varies between adjacent areas. The method further comprises determining whether a runout area at which a remaining amount of a consumable will be at or below a predetermined first amount when executing the print job fulfills a condition. The method further comprises determining a pausing point to be within the runout area when the runout area fulfills the condition, and determining a pausing point to be within a preceding area that fulfills the condition when the runout area does not fulfill the condition. The method still further comprises controlling the printing device 504 to pause printing of the print job at the pausing point.

In the examples discussed with reference to the Figures, the determination of the runout area and of the pausing point is based on the calculation of expected ink consumptions in a preview image. The physical printing process may start after the pausing point has been determined. The physical printing process pauses at the previously determined pausing point. Thus, the consumable that caused the printing process to pause can be replaced during operation, i.e., during printing.

With the printing systems and the method of the present disclosure, it is possible to pause printing at an area of the print job where negative effects on the image quality of the print are low. For example, when the print job was paused at an area of high ink density, then the image quality would suffer because the point at which the print head stopped is visible in the printed image.

However, according to the present examples, the print job stops at a low ink density area. Accordingly, the point at which the print head stopped is not or not clearly visible in the printed image and thus the impact on the image quality is lower compared to pausing points at high ink density areas.

Furthermore, a remaining amount of the consumable can be efficiently used. For example, the remaining amount of ink in an ink cartridge can be efficiently used and the lifetime of the consumables can be extended.

The controller 101 may decide whether or not to set a pausing point depending on the used media type, the roll-width or an inked area width. The decision may also depend on the print quality according to a number of passes, i.e., how often the print head passes over a certain area before the media is fed forward.

It will be appreciated that examples described herein can be realized in the form of hardware, machine readable instructions or a combination of hardware and machine readable instructions. Any such machine readable instructions may be stored in the form of volatile or non-volatile storage such as, for example, a storage device like a ROM, whether erasable or rewriteable or not, or in the form of memory such as, for example, RAM, memory chips, device or integrated circuits or an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein.

All of the features disclosed in the specification, including any accompanying claims, abstract and drawings, and/or all of the features of any method or process disclosed herein may be combined in any combination, except combinations where at least some of such features are mutually exclusive. In addition, features disclosed in connection with a system may, at the same time, present features of a corresponding method, and vice versa.

Each feature disclosed in the specification, including any accompanying claims, abstract and drawings, may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. A printing system comprising:
   a controller and a printing device,
   the controller to:
   divide a print job into a collection of areas, wherein a print density of an image varies between adjacent areas of the collection of areas,
   determine a pausing point to be within a runout area at which a remaining amount of a consumable is at or below a predetermined first amount when executing the print job responsive to the runout area fulfilling a condition, and determine the pausing point to be within a preceding area that fulfills the condition responsive to the runout area not fulfilling the condition wherein the condition is fulfilled when the print density is at or below a threshold, and
   control the printing device to pause the print job at the pausing point.

2. The printing system of claim 1, wherein the controller is to divide the print job into a sequence of areas based on preview image data.

3. The printing system of claim 1, wherein the collection of areas is a sequence of horizontal areas that are perpendicular to a print medium feed direction.

4. The printing system of claim 1, wherein the controller is to determine a remaining amount of the consumable associated with each respective area of the collection of areas based on an expected consumable consumption in the respective area for at least one color.

5. The printing system of claim 1, wherein the controller is to control the printing device to pause printing of the print job at the pausing point when a print medium is of a first media type, and to control the printing device to pause printing of the print job at a point where the amount of consumable runs out when the print medium is of a second media type.

6. The printing system of claim 1, wherein the controller is to control the printing device to pause printing of the print job at the pausing point when a print medium comprises a first width, and to control the printing device to pause printing of the print job at a point where the amount of consumable runs out when the print medium comprises a second width.

7. A printing system comprising:
   a controller and a printing device,
   the controller to:
   divide a print job into a collection of areas, wherein an image property varies between adjacent areas of the collection of areas,
   determine a pausing point to be within a runout area at which a remaining amount of a consumable is at or below a predetermined amount when executing the print job responsive to the runout area fulfilling a condition, and determine the pausing point to be within a preceding area that fulfills the condition responsive to the runout area not fulfilling the condition,
   select the preceding area that fulfills the condition responsive to the runout area not fulfilling the condition by:
   comparing a remaining amount of the consumable at a first area that fulfills the condition with a remaining amount of the consumable at a second area that fulfills the condition, and
   selecting the second area as the preceding area responsive to the remaining amount of the consumable at the second area being smaller than the remaining amount of the consumable at the first area that fulfills the condition, and
   control the printing device to pause the print job at the pausing point.

8. The printing system of claim 7, wherein the controller is to:
   determine the image property of the areas of the collection of areas, and
   differently weigh different colors when determining the image property.

9. The printing system of claim 8, wherein the controller is to assign highest weights to black and magenta.

10. The printing system of claim 7, wherein the image property comprises a print density of an image, and the condition is fulfilled by an area of the collection of areas if the print density of the area is at or below a threshold.

11. A non-transitory machine-readable storage medium encoded with instructions executable by a processing resource of a computing device to:
    divide a print job into a sequence of areas, wherein an image property varies between adjacent areas of the sequence of areas,
    prior to beginning the print job by a printing device:
    determine a runout area at which a remaining amount of a consumable is predicted to be at or below a predetermined first amount when executing the print job,
    determine a pausing point to be within the runout area responsive to the runout area fulfilling a condition, determine the pausing point to be within a preceding area that fulfills the condition responsive to the runout area not fulfilling the condition, and during printing of the print job, control the printing device to pause printing of the print job at the pausing point.

12. The non-transitory machine-readable storage medium of claim 11, wherein the image property comprises a print density of an image, and the condition is fulfilled by an area of the sequence of areas if the print density of the area is at or below a threshold.

13. The non-transitory machine-readable storage medium of claim 11, wherein the instructions are executable by the processing resource to select the preceding area that fulfills the condition responsive to the runout area not fulfilling the condition by:

comparing a remaining amount of the consumable at a first area that fulfills the condition with a remaining amount of the consumable at a second area that fulfills the condition, and selecting the second area as the preceding area responsive to the remaining amount of the consumable at the second area being smaller than the remaining amount of the consumable at the first area.

\* \* \* \* \*